(12) United States Patent
Fella

(10) Patent No.: US 7,848,013 B2
(45) Date of Patent: Dec. 7, 2010

(54) OPTICAL FIBER AMPLIFICATION SYSTEM

(75) Inventor: Paolo Fella, Valvori (IT)

(73) Assignee: Ericsson AB, Stockholm (SE)

( * ) Notice: Subject to any disclaimer, the term of this patent is extended or adjusted under 35 U.S.C. 154(b) by 1019 days.

(21) Appl. No.: 10/510,796

(22) PCT Filed: Apr. 30, 2003

(86) PCT No.: PCT/IB03/01949

§ 371 (c)(1),
(2), (4) Date: Jun. 26, 2006

(87) PCT Pub. No.: WO03/094394

PCT Pub. Date: Nov. 13, 2003

(65) Prior Publication Data

US 2009/0128891 A1 May 21, 2009

(30) Foreign Application Priority Data

Apr. 30, 2002 (IT) .......................... MI2002A0922

(51) Int. Cl.
*H01S 3/00* (2006.01)
(52) U.S. Cl. .................... 359/334; 359/341.3
(58) Field of Classification Search ................ 359/334, 359/341.3; 385/24
See application file for complete search history.

(56) References Cited

U.S. PATENT DOCUMENTS

| | | | | |
|---|---|---|---|---|
| 5,457,568 A | * | 10/1995 | Jacobovitz-Veselka et al. | 359/341.3 |
| 5,883,736 A | * | 3/1999 | Oshima et al. | 359/341.33 |
| 6,147,794 A | * | 11/2000 | Stentz | 359/334 |
| 6,163,636 A | * | 12/2000 | Stentz et al. | 385/24 |
| 6,961,522 B1 | * | 11/2005 | Castagnetti et al. | 398/92 |

FOREIGN PATENT DOCUMENTS

| | | |
|---|---|---|
| EP | 0 485 101 A2 | 5/1992 |
| EP | 1 022 870 A2 | 1/2000 |
| EP | 1 102 114 A1 | 5/2000 |
| EP | 1 022 870 A2 | 7/2000 |
| EP | 1 102 114 A1 | 5/2001 |
| EP | 0 865 173 A3 | 1/2004 |
| WO | WO 01/052372 A1 | 1/2001 |
| WO | 01/52372 A1 | 7/2001 |
| WO | WO 02/05461 A2 | 1/2002 |

* cited by examiner

*Primary Examiner*—Mark Hellner
(74) *Attorney, Agent, or Firm*—Kirschstein, et al.

(57) ABSTRACT

An optical fiber amplifier pumping technique based on multiple stimulated Raman scattering (SRS) for optical communication systems includes a plurality of pump signals with increasing wavelength which are injected into a fiber. The wavelengths of such pump signals are such that, in cascade, each pump signal of the plurality is amplified by the pump signal of wavelength immediately shorter, while it amplifies that with the wavelength immediately higher with the pump signal of highest wavelength which, in turn, pumps a remote rare earth doped optical fiber amplifier.

14 Claims, 4 Drawing Sheets

OPTICAL FIBER AMPLIFICATION SYSTEM

Figure 1:
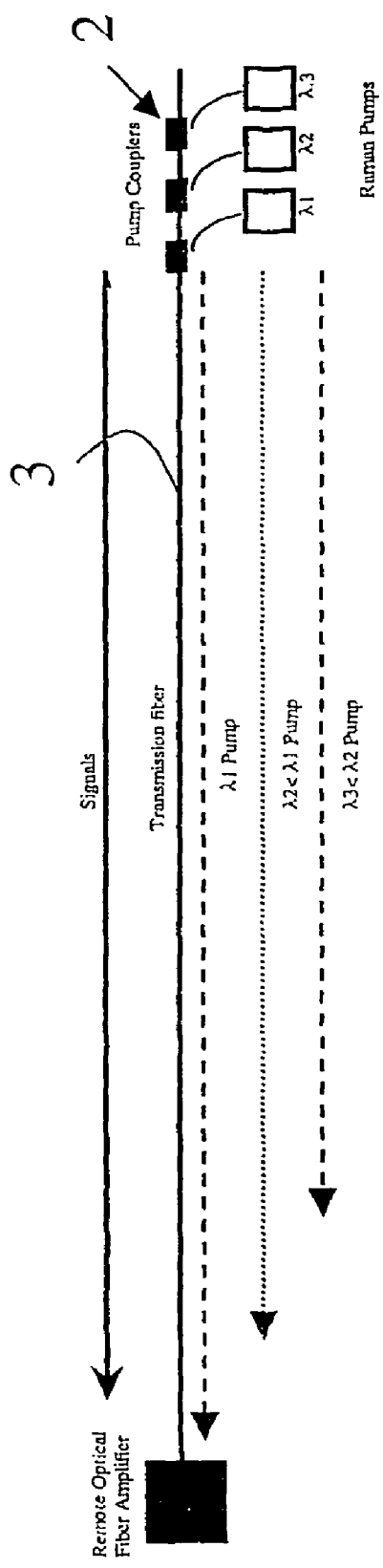

The present invention relates to an optical fiber amplifier pumping system based on multiple Stimulated Raman Scattering (SRS), for optical communication systems.

Raman-effect amplifiers are well known and are based on the fact that a luminous signal running along an optical fiber can be amplified i.e. "pumped" by sending in the same fiber a beam (termed "pump") with a wavelength having a certain relationship with the wavelength of the signal to be amplified.

The configurations of present-day optical amplifiers with RAMAN effect are mainly two. The first consists of counter propagating Raman pumping in which the pump laser sends into the fiber a beam with predetermined frequency in the direction opposite the direction of propagation of the signals it is desired to amplify. The second consists of a co-propagating and counter propagating Raman pumping in which there are two pump lasers at the two ends of the fiber travelled by the signal to be amplified so as to have a pump beam at a first frequency propagating in a direction opposite that of the signal to be amplified and a second beam at a second lower frequency propagating in the same direction as the signal. With appropriate choice of frequencies the co propagating pump beam amplifies the counter propagating pump beam which in turn amplifies the signal.

A particular type of optical amplifiers are the optical fiber amplifiers (rare earth ions doped) with remote pumping in which the amplification effect is produced in a rare earth ions doped Fiber (i.e. Erbium doped fiber) placed in series with the transmission fiber which is traversed both by the signal to be amplified and by a pump signal coming from a distant point along the communication fiber. The latter is responsible for the pumping and resulting optical amplification supplied by the remote rare earth ions doped optical fiber amplifier (EDFA).

Such amplifiers suffer from the disadvantage that the pump laser cannot be placed at a very great distance from the doped fiber to be pumped since the attenuation induced by the transmission fiber which the pump beam would undergo would make amplification in the doped fiber too limited.

The general purpose of the present invention is to remedy the above mentioned shortcomings by making available an optical fiber amplifier pumping technique providing an improved pumping of a remote optical fiber amplifier.

According to this invention an optical fiber amplifier pumping system based on multiple stimulated Raman scattering for optical communication systems includes an optical fiber amplifier and means for generating plurality of pump signals with increasing wavelength which are injected into a transmission fiber with the wavelengths of the pump signals being such that in cascade each pump signal of the plurality is amplified by the pump signal of shorter wavelength immediate below while it amplifies the pump signal with longer wavelength immediately higher and the pump signal of longest wavelength being arranged to pump the optical fiber amplifier which is located remotely from said generating means.

Figure 2:
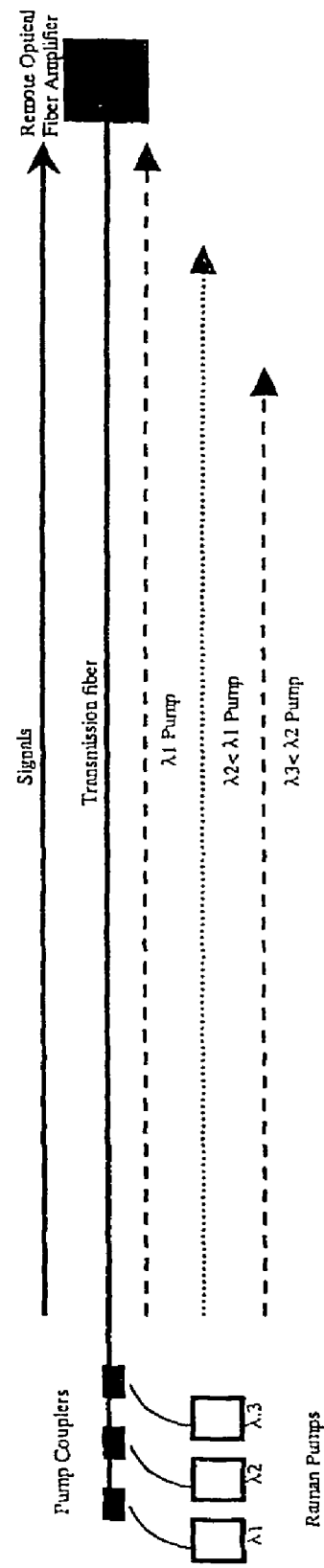
Figure 3:
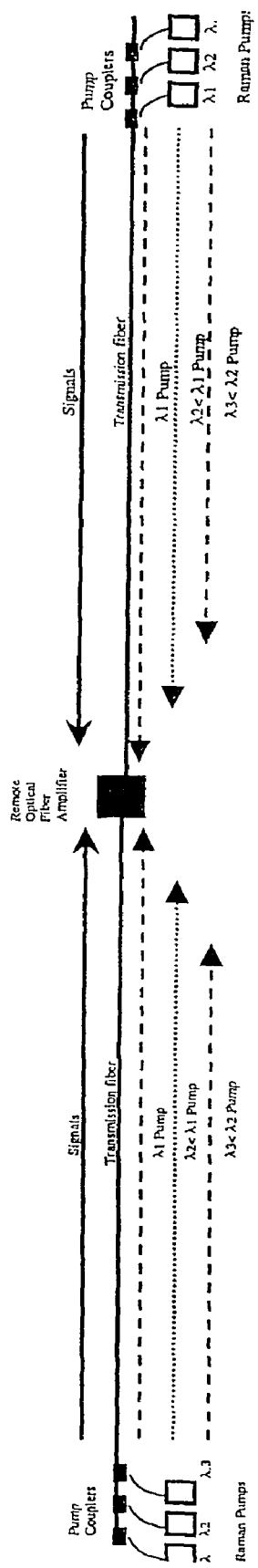
Figure 4:
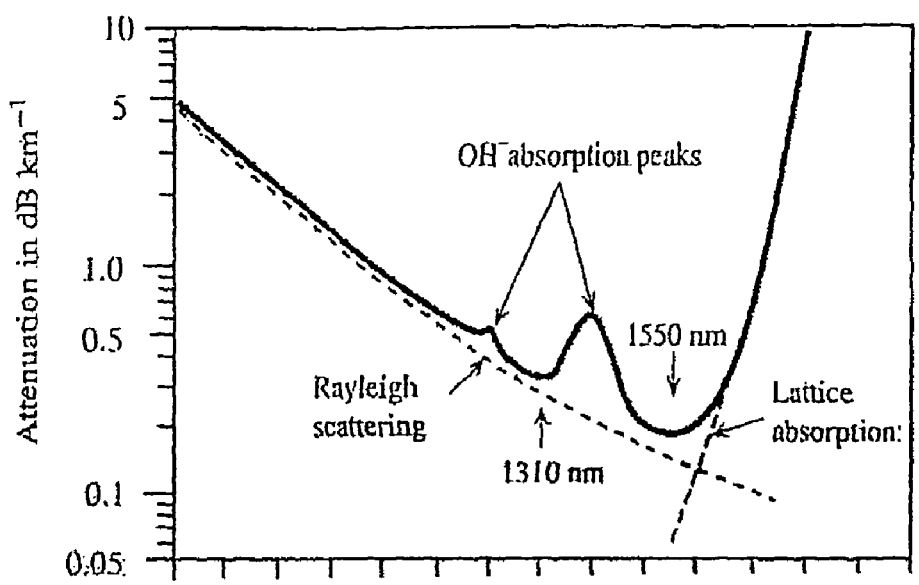
Figure 5:
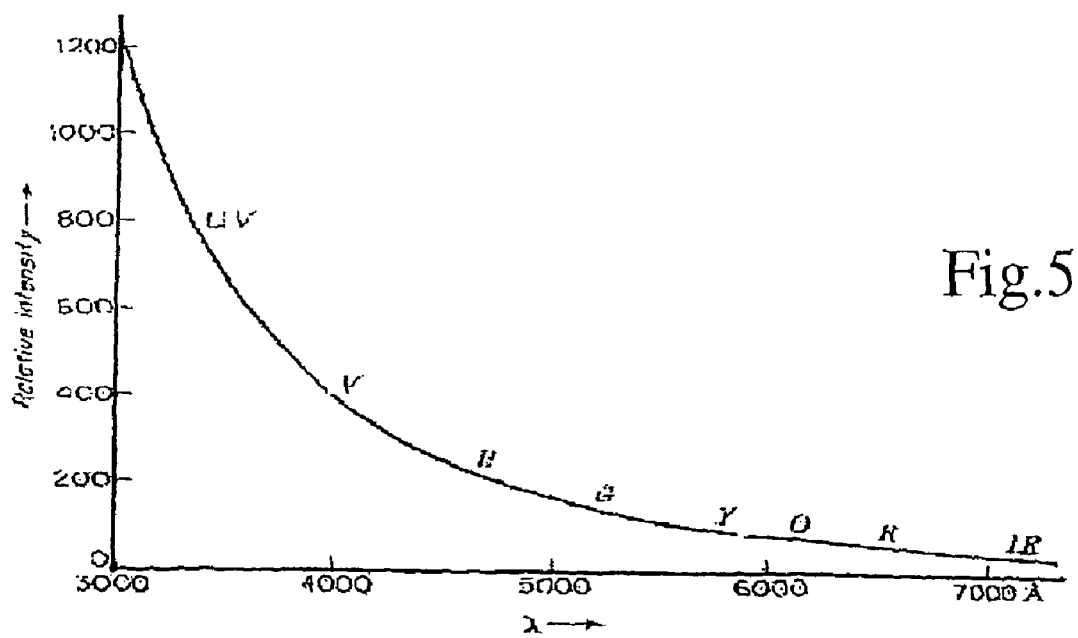
Figure 6:
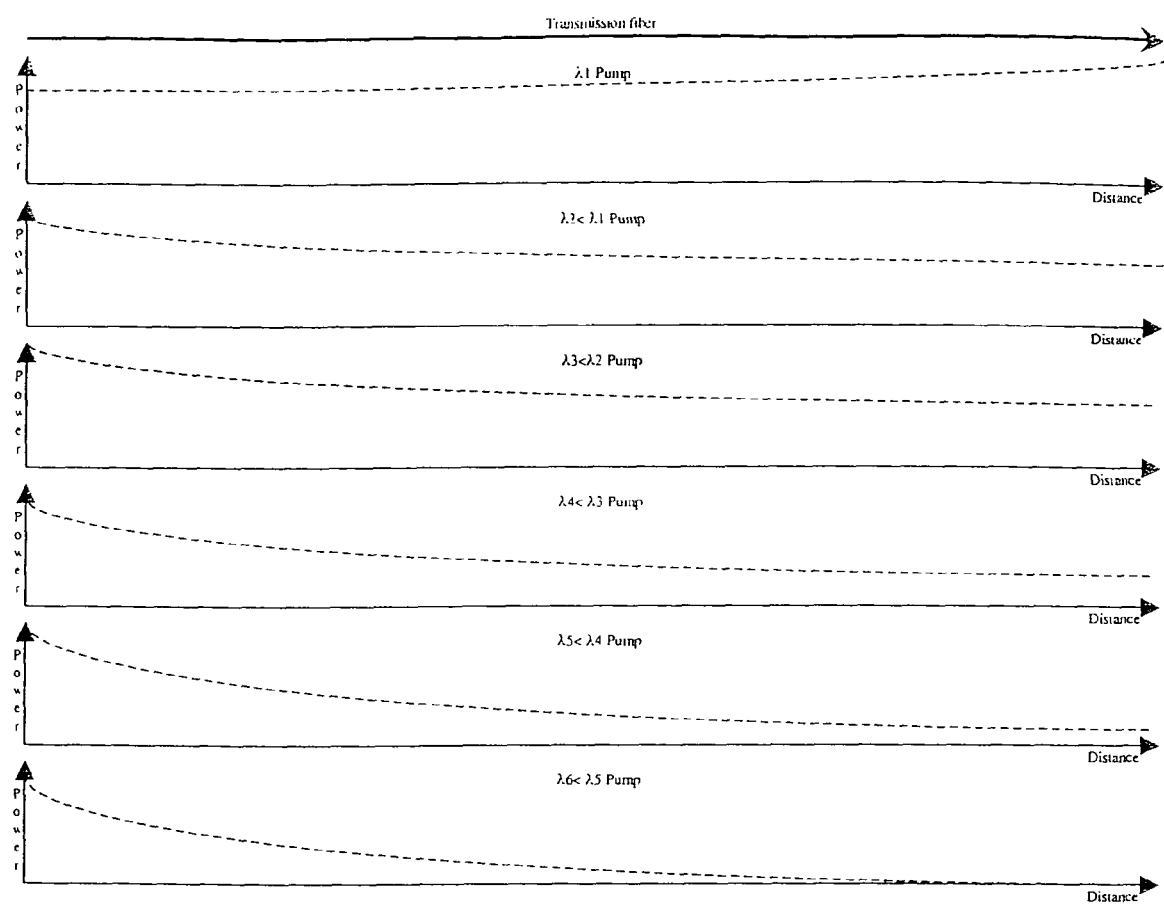

To clarify the explanation of the principles of the present invention and its advantages compared with the prior art the invention is further described by way of example with reference to the accompany drawings in which:

FIG. 1 shows a diagrammatic view of a first application of the pumping technique in accordance with the present invention, FIG. 2 shows a diagrammatic view of a second application of the pumping technique in accordance with the present invention, FIG. 3 shows a diagrammatic view of a third application of the pumping technique in accordance with the present invention, FIG. 4 shows a graph of the attenuation of a generic fiber as a function of the wavelength of the signal travelling it, FIG. 5 shows a graph of the dependence of the Rayleigh scattering on the wavelength of the signal, and FIG. 6 shows a graph of a possible distribution of the pump powers and of the remote pump signal along the transmission fiber.

With reference to the FIGS, FIG. 1 shows an exemplifying diagram of the pumping system in accordance with the present invention. The architecture is based on a multiple Stimulated Raman Scattering making use of the contribution of a plurality of pumps which input pump signals by means of appropriate known couplers at the ends of an optical fiber section 3. These pumps are characterized in that they have decreasing wavelength starting from the pump with longest wavelength which that responsible for the remote pumping of the optical fiber amplifier 4. As may be seen in FIG. 1, the pumps are arranged with same propagation direction that can be, in turn, co-propagating and/or counter propagating with the signal channels to be amplified by the remote EDFA 4 as shown in FIG. 1.

The shortest wavelength among those of the pump signals is chosen to produce the Raman amplification effect of the pump signal transmitted by the transmission fiber. The wavelengths of the pumps are chosen to maximize the Raman amplification effect between pairs of pumps with successive wavelength.

For example, assuming that the deviation in wavelength between two successive pumps is around 100 nm, for L band channels to be amplified by a remotely pumped EDFA, pumps with wavelength of 1380 nm, 1280 nm, 1180 nm, 1080 nm, 980 nm could be used placed at the same transmission fiber end in order to amplify the 1480 nm pump light responsible for the remote EDFA pumping as shown diagrammatically in FIG. 1.

Starting from 980 nm, it may be supposed that each pump amplifies the power of the co-propagating pump with wavelength longer than 100 nm. The power of each pump would otherwise decrease exponentially with the distance because of the intrinsic attenuation of the fiber as shown separately for each pump of FIG. 6. The amplification effect is provided for each pair of pumps with wavelengths which differ by 100 nm up to that of 1480 nm which actually pumps the remote EDFA.

Such a virtuous circle starting from the 980 nm pump ensures a quite higher level of power of the 1480 nm beam able to reach the remote EDFA placed at far longer distances from remote pump site in comparison with legacy technique, the technique furthermore provides more optical gain, higher output power and better Noise Figure to the optical fiber amplifier. Legacy technique consists of injecting the remote pump beam directly into the transmission fiber, and of course the distance from the remote pump and the doped fiber is limited due to transmission fiber attenuation. Naturally the number of pumps of different wavelengths will depend on the characteristics and the spectrum of signals to be amplified so as to obtain the cascade of Raman amplifications as mentioned above up to amplification of the useful pump signal. In particular, the separation between the pump wavelengths could also be less than 100 nm just as the individual pumps could be arranged differently as clarified below.

In a more general form, the shift between successive pumps to different wavelengths for example in a WDM system could be advantageously the following:

Band L: reference shift=85 +/−10 nm. Next higher Raman pump wavelength (responsible for amplification of the channels) in lambda: 1486 +/−10 nm.

Band C: reference shift=75 +/−10 nm. Next higher Raman pump wavelength (responsible for amplification of channels) in lambda: 1447 +/−10 nm.

Band S: reference shift=65 +/−10 nm. Next higher pump wavelength (responsible for amplification of the channels) in lambda: 1406 +/−10 nm.

The uncertainty of 10 nm is due in the first place to the fact that depending on the type of fiber the optimal reference shift varies as scattering is intrinsically dependent on the optical, physical and geometrical characteristics of the transmission fibers used in practice. In addition, with the decrease in pump wavelength the associated optimal shift in wavelength between one pump and another decreases. The magnitude of this decrease is not quantifiable in advance because it varies depending on the type of transmission fiber—and many are the types of fiber that can be used—and must be found experimentally each time. For example, there are various types of transmission fibers such as G.652, G.653, G.654, G.655 and G.652 without OH— peak (whose importance is described below), submarine fibers, negative chromatic dispersion fibers et cetera. To this is added that there are various fiber suppliers whose products have optical and physical characteristics sufficiently dissimilar for a given type of transmission fiber. In addition, in submarine systems often the physical optical characteristics of the transmission fibers to be used on a certain connection are decided each time on the basis of technical considerations. Downstream of this decision, the fiber is made with the characteristics required for optimal use.

All this without counting phenomena such as fiber aging or the use of fiber of the "legacy" type, things which can cause variations in the physical characteristics of the fiber with respect to those which it is legitimate to expect from a normal, new fiber. Again, a bare fiber wound on a spool has certain physical characteristics which change even drastically when the fiber is cabled for field installation or when the fiber is aggregated with others in a multifiber cable.

In addition, the points of reflection, of the fiber and its Rayleigh Backscattering vary depending on the case because of aging of the cabling, climatic conditions et cetera. For all these reasons and others, experimental shifting of the wavelengths of the pumps, relatively and absolutely, could be necessary anyway.

In any case, it is important that the wavelengths be selected to bring about the cascade amplification effect of all the pumps up to remote EDFA pumping of the transmission signal channels by means of the last pump of the cascade so as to have a higher power pump signal when it reaches the EDF fiber.

In the embodiment of FIG. 1 the multiple SRS architecture of the pumping technique configuration in accordance with the present invention has all the pumps at the same end of the fiber.

Other aspects are to be taken into consideration.

It is well known that attenuation of the fibers increases with decrease in the wavelength as shown by way of example in FIG. 4 for a generic fiber.

The graph of FIG. 4 shows the typical OH— attenuation peaks of the fibers even if the length of the fibers will probably lead to elimination of such peaks. It must therefore be considered that the power of the pump with shortest wavelength (for example, in the case shown, 980 nm) will probably have to be greater than the pump with the longest wavelength because it does not benefit by any SRS amplification as compared to the other pumps. This is all the more true if one also considers the additional attenuation of the shorter wavelengths (<1 dB/km@980 nm, <0.6 dB/km@1080 nm) and the fact that the pump with the shortest wavelength is propagated in the fiber in a multimode manner and that therefore allowance must be made for an additional loss of power for all wavelengths shorter than the cut-off wavelength.

But another aspect must be considered which in some way reduces these disadvantages and makes very advantageous the solution of the present invention. This other aspect is the dependence of Raman Scattering on wavelength.

Indeed, Raman Scattering is a particular case of Rayleigh Scattering. The latter can be represented by the formula $\alpha_R = [8\pi^3(n^2-1)^2 \beta_T K_B T_f]/3\lambda^4$.

This formula shows clearly that the scattering is reduced by a factor $1/\lambda^4$. There is thus a trend as shown in FIG. 5.

Therefore, ignoring fiber attenuation and assuming the same amount of power for two pumps launched in the same fiber, a short wavelength supplies more Stimulated Raman Scattering than a longer wavelength.

The shorter wavelengths will thus have to be pumped more than the longer ones but not too much.

In addition, multimode propagation allows more powerful pumping as compared with the pump powers guided individually because of location of the power far from the nucleus in the higher order modes.

There remain to be considered the effects of multimode propagation.

Many of the present transmission fibers supply a cut-off wavelength approximately less than 1260 nm. Below this limit there is multimode transmission and this could at first glance provide some advantage. Excitation at a higher order of modes allows better distribution of power over the cross section of the fiber. This leads to an immediate result, i.e. once a power level is decided below which there are no disadvantages for the basic mode (LP01) more power could be used in the fiber thanks to propagation in the higher modes. These modes distribute the power far from the central nucleus spatially in a different way with respect to the LP01 mode. This avoids problems which would arise from the treatment of high powers in the fiber.

Briefly and just to mention a simple example, if the concentration of high power levels at some points of the fiber nucleus causes problems, the source with the shortest wavelength (980 nm) can pump far more power than a source with longer wavelength (1480 nm) due to the different distribution of power in the fiber nucleus or, in other words, due to the excitation in higher order modes.

This is clearly an advantage of the present solution if it is considered that it is necessary to pump more strongly at shorter wavelengths.

It is known that with the increase in pump power beyond a certain level, the gain given by the Raman effect decreases since the intensity of the amplified signal becomes so high that it loses power as a result of the development of Stokes effects at a higher order j=>1).

This might seem to be a problem in the case of the above.

One problem of the present invention could appear that of the ability or not of the fiber to support the high power level sent into it because of the use of multiple pumps and which could cause "burning" of the fiber. Fiber burning is blackening of a cross section of the transmission means which obviously involves a high attenuation of the transmitted signals.

Various techniques could be used to avoid the phenomenon.

One particularly advantageous innovative technique was found to be the following.

Let us consider pump lasers having wavelength less than 1260 nm. They propagate multimodally. In the case of propagation in individual mode for each wavelength and each type of fiber of interest, once the burning power-threshold is identified the lasers can probably overcome without burning problems this pumping limitation caused by multimode propagation. This improves their ability to go far through the fiber as compared with sources with wavelength less than 1260. This applies decreasingly when one approaches the above mentioned cut-off wavelength because of the excitation of a smaller number of higher order modes. Nevertheless, this apparent decrease in the ability to pump more power when the wavelength of the source increases is in some measure compensated for just by the same multiple SRS mechanism of the present invention by means of which each pump is amplified by the pump with wavelength immediately below while it amplifies that of the wavelength immediately above. This also applies to pump lasers with wavelength greater than 1260 nm without forgetting that these are pumped by SRS effect along the fiber in a more distributed, improved and increased manner. This means that pump lasers with long wavelength should not be launched in the fiber with critical power levels.

In particular, this applies to pumps in the neighbourhood of 1480 nm.

The technique of the present invention described above is to be used with profit in the known field of Remote Rare Earth Ions Doped Fiber Amplification (e.g. Erbium, Tellurium and so on).

For instance, remote EDFA pumping can consist of pumping (i.e. at 1480 nm) an EDF fiber arranged far from the transmitting side. Obviously the EDF cannot be arranged farther than two dozen dB from the transmission booster. In known systems the corresponding linear distance is usually at most a few tenths of a kilometer. This distance can be enormously increased by means of the use of the pumping technique using SRS multiple distributed amplification described here. Naturally the Raman pumps with different wavelength must all be located at each other or both ends of the transmission fiber. In the first case the Raman pumps can be divided in two sets corresponding to a transmission fiber end. This means that a Raman pumps set co-propagate with the transmission signals, the other counter-propagates instead (Refer to FIG. 1, 2, 3,).

It is now clear that the predetermined purpose to provide a better pumping technique for remote optical fiber amplifiers (i.e. EDFAs) has been achieved by making available an innovative pumping system making use of multiple SRS amplification with advantages and ample applicative spectrum. It is noteworthy to point out that in most cases the remote pump signal can distributely Raman amplify the signals channels throughout the transmission fiber. Of course this can be considered as an additional benefit in terms for channels optical transmission.

Naturally the above description of an embodiment applying the innovative principles of the present invention is given by way of non-limiting example of said principles within the scope of the exclusive right claimed here.

The invention claimed is:

1. An optical fiber amplifier pumping system based on multiple stimulated Raman scattering (SRS) for optical communication systems, comprising:
   an optical fiber amplifier; and
   at least one pump for generating a plurality of pump signals with increasing wavelengths for injection into a transmission fiber having a cut-off frequency,
   the wavelengths of the pump signals being such that, in cascade, of each pair with successive wavelengths of the plurality of pump signals, the pump signal with longer wavelength is amplified by the pump signal of shorter wavelength immediately below,
   the pump signal with the shortest wavelength having a power greater than a power of the pump signal with the longest wavelength and having a wavelength shorter than the cut-off frequency of the transmission fiber so as to propagated in a multimode manner, and
   the pump signal of the longest wavelength being arranged to pump the optical fiber amplifier which is located remotely from the at least one pump.

2. The system in accordance with claim 1, in that, with cascade amplification, the pump signal with the longest wavelength has a value in a range from 600 to 2900 nm.

3. The system in accordance with claim 1, in that the plurality of pump signals per signal to be amplified numbers at least two.

4. The system in accordance with claim 1, in that the at least one pump is arranged at one end of the transmission fiber.

5. The system in accordance with claim 1, in that the at least one pump is arranged at a same end of the transmission fiber as that at which co-propagating transmission channel signals are introduced.

6. The system in accordance with claim 1, in that the at least one pump is arranged at an opposite end of the transmission fiber to that at which counter-propagating transmission channel signals are introduced.

7. The system in accordance with claim 1, in that the pump signals are arranged at both ends of the transmission fiber with a first pumping beam counter propagating and another pump beam co-propagating with transmission channel signals.

8. The system in accordance with claim 1, in that for a wavelength division multiplex (WDM) signal to be amplified, a frequency shift between successive pump signals with different wavelengths is:
   a) for Band L, the reference shift=85 +/−10 nm, and the longest Raman pump wavelength is 1486 +/−10 nm;
   b) for Band C, the reference shift=75 +/−10 nm, and the longest Raman pump wavelength is 1447 +/−10 nm; and
   c) for Band S, the reference shift=65 +/−10 nm, and the longest Raman pump wavelength is 1406 +/−10 nm.

9. The system in accordance with claim 1, in that the optical fiber amplifier comprises a segment of rare earth doped optical fiber in such a manner as to obtain an optical fiber amplifier with remote pumping.

10. The system in accordance with claim 1, in that the optical fiber amplifier is located remotely from the at least one pump by being placed in series with the transmission fiber.

11. The system in accordance with claim 1, in that the at least one pump is arranged to generate at least three pump signals.

12. An optical communication system, comprising an optical fiber amplifier pumping system based on multiple stimulated Raman scattering (SRS), the optical fiber amplifier pumping system comprising:
   an optical fiber amplifier; and
   at least one pump for generating a plurality of pump signals with increasing wavelengths for injection into a transmission fiber having a cut-off frequency,
   the wavelengths of the pump signals being such that, in cascade, of each pair with successive wavelengths of the plurality of pump signals, the pump signal with longer wavelength is amplified by the pump signal of shorter wavelength immediately below, the pump signal with the shortest wavelength having a power greater than a power of the pump signal with the longest wavelength and having a wavelength shorter than the cut-off frequency of the transmission fiber so as to propagated in a multimode manner, and the pump signal of the longest wavelength being arranged to pump the optical fiber amplifier which is located remotely from the at least one pump.

13. The system in accordance with claim 12, in that the optical fiber amplifier is located remotely from the at least one pump by being placed in series with the transmission fiber.

14. The system in accordance with claim 12, in that the at least one pump is arranged to generate at least three pump signals.

* * * * *

UNITED STATES PATENT AND TRADEMARK OFFICE
CERTIFICATE OF CORRECTION

| | |
|---|---|
| PATENT NO. | : 7,848,013 B2 |
| APPLICATION NO. | : 10/510796 |
| DATED | : December 7, 2010 |
| INVENTOR(S) | : Fella |

Page 1 of 1

It is certified that error appears in the above-identified patent and that said Letters Patent is hereby corrected as shown below:

In Column 4, Line 56, delete "j=>1)." and insert -- (j=>1). --, therefor.

Signed and Sealed this
Twenty-fourth Day of May, 2011

David J. Kappos
*Director of the United States Patent and Trademark Office*